United States Patent
Nordström et al.

(10) Patent No.: US 6,987,800 B2
(45) Date of Patent: Jan. 17, 2006

(54) DSL TRANSMISSION SYSTEM WITH FAR-END CROSSTALK CANCELLATION

(75) Inventors: Tomas Nordström, Luleå (SE); Daniel Bengtsson, Luleå (SE); Olivier Isson, La Tronche (FR)

(73) Assignees: STMicroelectronics S.A., Gentilly (FR); STMicroelectronics N.V., Amsterdam (NL)

( * ) Notice: Subject to any disclaimer, the term of this patent is extended or adjusted under 35 U.S.C. 154(b) by 877 days.

(21) Appl. No.: 09/737,155

(22) Filed: Dec. 14, 2000

(65) Prior Publication Data

US 2001/0006510 A1 Jul. 5, 2001

(30) Foreign Application Priority Data

Dec. 14, 1999 (EP) .............................. 99410174

(51) Int. Cl.
*H04B 1/38* (2006.01)

(52) U.S. Cl. ....................... 375/220; 375/222
(58) Field of Classification Search ................. 375/219, 375/200, 222, 259, 220, 221, 226
See application file for complete search history.

(56) References Cited

U.S. PATENT DOCUMENTS

| | | | |
|---|---|---|---|
| 5,181,198 A | 1/1993 | Lechleider | |
| 5,271,037 A | 12/1993 | Szechenyi | 375/14 |
| 5,511,119 A | 4/1996 | Lechleider | |
| 5,887,032 A | 3/1999 | Cioffi | 375/257 |
| 6,049,607 A * | 4/2000 | Marash et al. | 379/406.08 |
| 6,148,024 A * | 11/2000 | Ho et al. | 375/222 |
| 6,400,781 B1 * | 6/2002 | Vandendorpe et al. | 375/350 |
| 6,628,738 B1 * | 9/2003 | Peeters et al. | 375/371 |
| 6,744,821 B1 * | 6/2004 | Van Acker et al. | 375/260 |

FOREIGN PATENT DOCUMENTS

WO WO 97/06619 A1 2/1997

OTHER PUBLICATIONS

European Search Report from European application No. 99410173.1, filed Dec. 14, 1999.

* cited by examiner

*Primary Examiner*—Emmanuel Bayard
(74) *Attorney, Agent, or Firm*—Lisa K. Jorgenson; James H. Morris; Wolf, Greenfield & Sacks, P.C.

(57) ABSTRACT

The invention relates to a far-end crosstalk canceling circuit for a digital subscriber line transmission system, the transmission system including a plurality of line termination modems receiving discrete multitone symbols from corresponding network termination modems over a plurality of transmission channels. The invention estimates the modulated data actually transmitted by the network termination modems from the frequency components of the discrete multitone symbols received by the line termination modems and to evaluate the far-end crosstalk as a linear combination of these estimates. Far-end crosstalk cancellation for all the line termination modems is also provided in a centralized manner.

35 Claims, 3 Drawing Sheets

Fig 6

DSL TRANSMISSION SYSTEM WITH FAR-END CROSSTALK CANCELLATION

BACKGROUND OF THE INVENTION

1. Field of the Invention

The present invention relates to digital subscriber line transmission systems, which allow, in particular, high speed communication on twisted pair telephone lines based on discrete multitone transmission (DMT). The invention relates more specifically to a far-end crosstalk (FEXT) canceller for canceling the crosstalk signal induced by modems located at the far-end of such a transmission system.

2. Discussion of the Related Art

Figure 1:
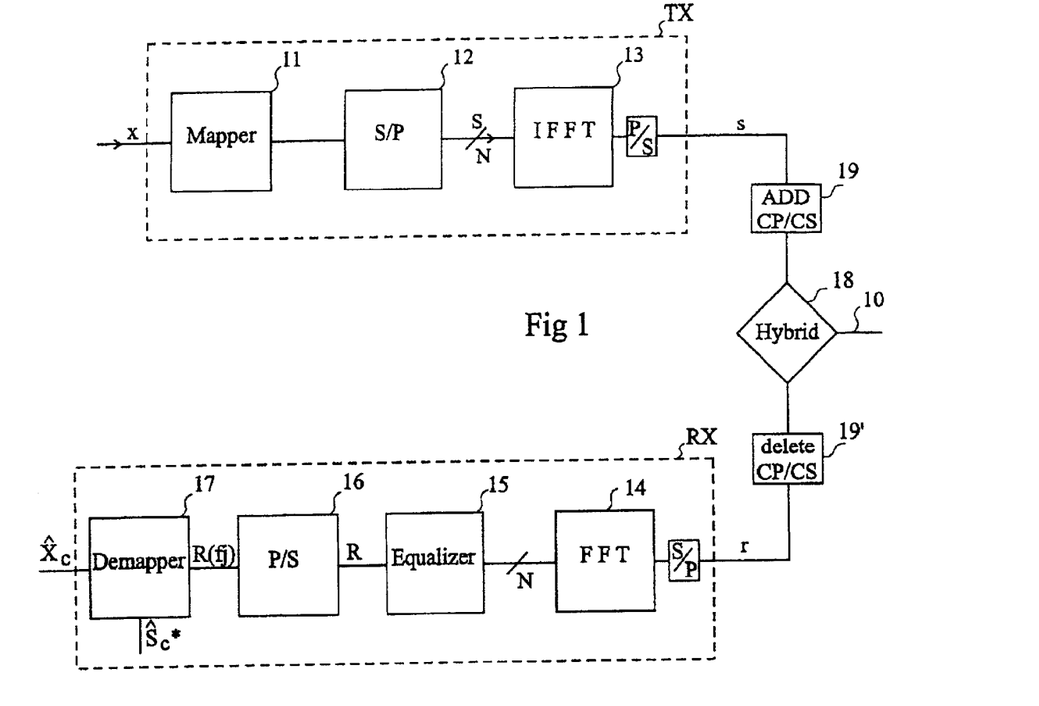
FIG. 1, previously described, schematically shows the structure of a modem suitable for use in a DSL transmission system.

FIG. 1 schematically shows a modem in a conventional DSL transmission system using discrete multitone. The modem includes a transmitter TX and a receiver RX. A serial stream of data X is provided to a mapper circuit 11 mapping each data into a symbol of a constellation, for example of a QAM (Quadrature Amplitude Modulation) constellation. The mapped values are then transformed into a set S of N components by a serial to parallel converter 12, each component of the set being considered as a frequency domain coefficient. This set of frequency domain coefficients, hereafter also called DMT symbol, is provided to an inverse fast Fourier transform (IFFT) circuit 13 which generates a time domain block of samples and is followed by a parallel/serial converter (P/S). This time domain block is therefore the sum of N sinusoidal subcarriers of different frequencies, the amplitude thereof being determined by the corresponding frequency domain coefficient received by the IFFT circuit.

Each time domain block is cyclically prefixed (cp) and suffixed (cs) in a block 19 to eliminate or at least attenuate the Inter Symbol Interference (ISI) and the Inter Carrier Interference (ICI) caused by the channel, and is transmitted onto a telephone line 10 through a hybrid line interface 18. The line interface 18 also receives incoming time domain blocks from another modem connected to line 10.

At the receiving side, the incoming time domain blocks from line 10 are provided to a fast Fourier transform (FFT) circuit 14 through a block 19' that deletes the prefix and suffix and a serial/parallel converter (S/P) which calculates the N frequency domain coefficients for each block. The N frequency domain coefficients are then provided to an equalizer 15 which compensates for the attenuation and phase shift incurred by each frequency component. The equalized values are then serialized by a parallel to serial converter 16 into a stream of N complex numbers R(fj) and then processed by a demapper 17 attributing to each R(fj) the symbol $\hat{S}c$ of the constellation which comes closest thereto. The demapper 17 further outputs the digital word $\hat{X}c$ associated with the selected constellation point $\hat{S}c$.

Figure 2:
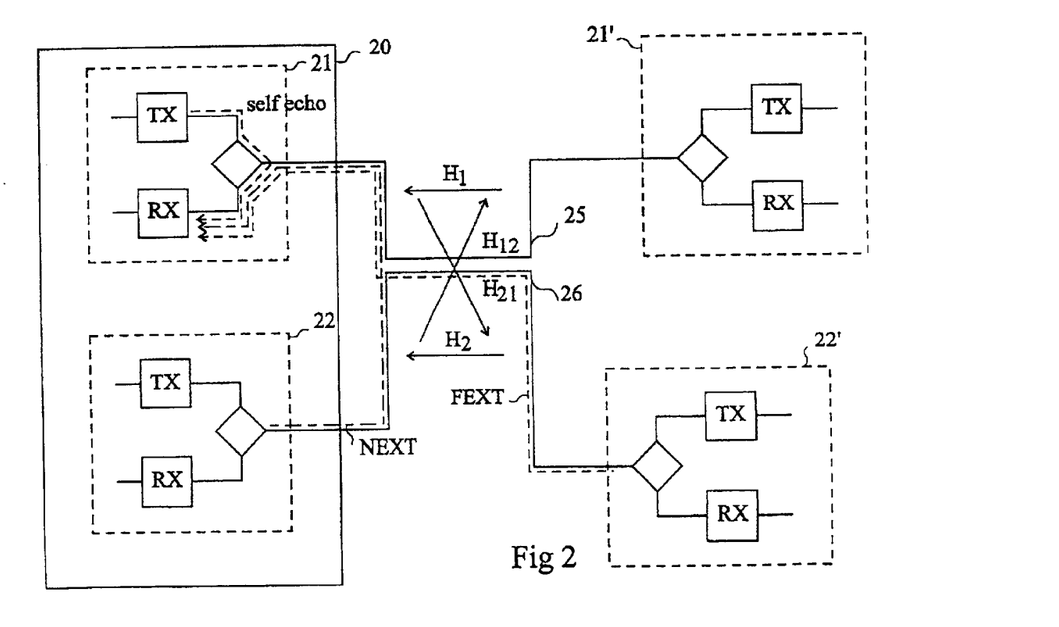
FIG. 2, previously described, schematically shows the different types of noise occurring in a DSL transmission system.

FIG. 2 schematically shows a DSL transmission system including a central office 20 communicating with a plurality of end-users over telephone lines 25, 26. Modems 21, 22, 21', 22' have the structure represented in FIG. 1. The end of a telephone line connected to a modem of the central office 20 is called the line termination (LT) side while the end connected to a modem of an end-user is called the network termination (NT) side.

Ideally, such a DSL transmission system allows the whole frequency band to be used for simultaneous full-duplex transmissions. However, in practice, different sources of noise disturb the transmissions and impede proper reception of data.

For a given modem, three different sources of noise can be distinguished as illustrated in FIG. 2:

the self-echo, i.e. for a given modem, the parasitic signal from the transmitter TX leaking to the receiver RX through the hybrid interface;

the near-end crosstalk (NEXT) arising from signals in adjacent telephone lines 25, 26 with opposite transmission directions. More specifically, in the present example, the NEXT generated at the modem 21 is the parasitic signal received by this modem from the modem 22. In this instance the NEXT is called LT-NEXT because the modem 21 is located on the LT side. Reciprocally, the NEXT generated at modem 21' by the modem 22' is called NT-NEXT;

the far-end crosstalk (FEXT) arises from signals traveling along the same transmission direction in adjacent telephone lines. More precisely, in the illustrated example, the FEXT generated at the modem 21 is the parasitic signal received by this modem from the modem 22' located on the opposite side, due to the coupling between the telephone lines 25 and 26 sharing a common binder. In this instance the FEXT is called LT-FEXT because the modem 21 is located on the LT side. Reciprocally, the FEXT generated at modem 21' by the modem 22 is called NT-FEXT.

Echo-cancellers for canceling self-echoes are known e.g. from U.S. patent application Ser. No. 09/410,636, filed Oct. 1, 1999 and entitled DSL TRANSMISSION SYSTEM WITH ECHO-CANCELLATION, which is incorporated herein by reference.

There is also known from U.S. Pat. No. 5,887,032, which is incorporated herein by reference, a canceller for canceling out the NEXT interference in an ADSL transmission system on the LT side. This canceller operates in the frequency domain and assumes, for a given subcarrier or tone, that the NEXT interference is proportional to the symbol value emitted by the modem transmitting on the interfering channel. The latter value is scaled by a given coefficient and subtracted from the symbol received by the modem suffering from the NEXT interference.

Both self-echo cancellation and LT-NEXT cancellation are possible because the signal transmitted by the same modem (in the case of the self-echo) or by a neighboring modem of the central office (in the case of LT-NEXT interference) is directly available.

FEXT cancellation is however intrinsically more complex than NEXT or self-echo cancellation because the modem transmitting over the interfering channel is now located on the far-end side and the actual values of the interfering symbols are therefore not known.

SUMMARY OF THE INVENTION

An object of the present invention is to design a canceller circuit for a DMT based DSL transmission system capable of significantly removing the FEXT interference and having a simple structure.

Another object of the present invention is to design an efficient FEXT canceling method in a DMT based DSL transmission system.

These and other objects are achieved by a far-end crosstalk canceling circuit for a digital subscriber line transmission system, said transmission system comprising a plurality of line termination modems receiving discrete multitone signals from corresponding network termination modems over a plurality of transmission channels, each modem comprising time/frequency transforming means for transforming said discrete multitone signals into a discrete multitone symbol of frequency components and demapping means outputting for each frequency component the symbol of the constellation nearest thereto and the corresponding demodulated data; estimation means, in at least one line termination modem, for estimating the constellation symbols actually sent by the network termination modems, from the frequency components of the discrete multitone symbols received by all modems; calculation means for calculating a linear combination of said estimated modulated data, for subtracting said linear combination from the frequency components of said at least one line termination modem and for applying a resulting difference to the demapping means of said at least one termination modem; error calculation means for calculating the error distance between the constellation symbol from said at least one line termination modem and said difference; and updating means for updating the coefficients of said linear combination as a function of said error distance.

The invention also provides a far-end crosstalk canceling method for a digital subscriber line transmission system, said transmission system comprising a plurality of line termination modems receiving discrete multitone signals from corresponding network termination modems over a plurality of transmission channels, each line termination modem comprising frequency transforming means for transforming said discrete multitone signals into a discrete multitone symbol of frequency components, and demapping means outputting for each frequency component the symbol of the constellation nearest thereto and the corresponding demodulated data, the method comprising the steps of: estimating, for at least one line termination modem, the constellation symbols actually sent by all the modems from the frequency components of the discrete multitone symbols received by said modems; calculating a linear combination of said estimated symbols, subtracting said linear combination from the frequency components of a discrete multitone symbol and applying the resulting difference to the demapping means of said at least one modem, to obtain a constellation symbol; calculating the error distance between said constellation symbol and said difference; and updating the coefficients of said linear combination as a function of said error distance.

The foregoing and other objects, features, aspects and advantages of the invention will become apparent from the following detailed description of embodiments, given by way of illustration and not of limitation with reference to the accompanying drawings.

DETAILED DESCRIPTION

The invention is based on the idea that the actual value of a symbol causing FEXT interference at the LT side can be obtained from the modem receiving this symbol. The modem receiving the FEXT interfering symbol and the modem receiving the FEXT corrupted symbol being both located at the central office, a connection between the two modems can be realized.

Figure 3:
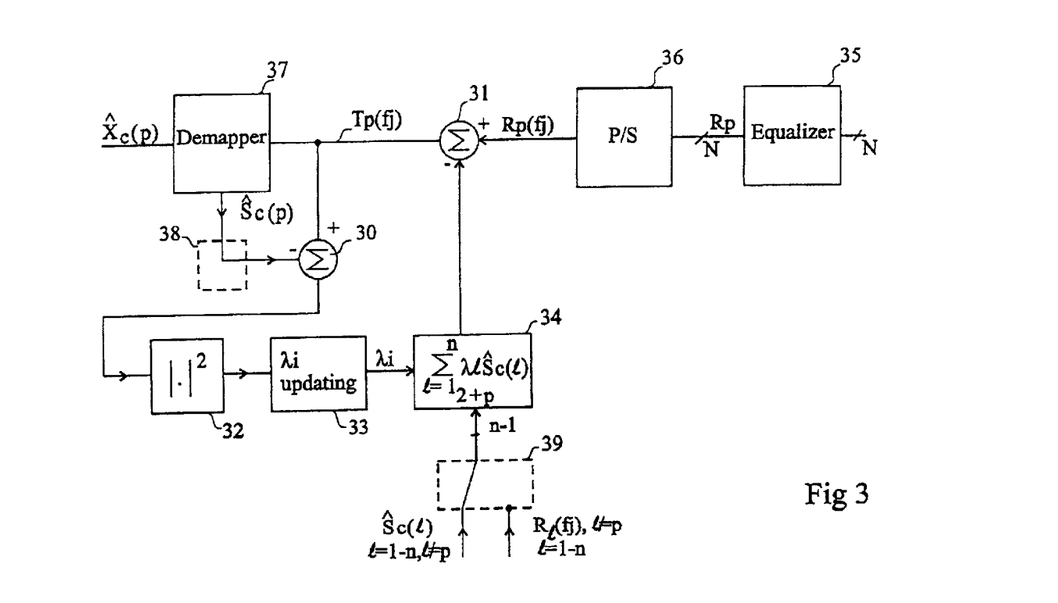
FIG. 3 shows a first and a second embodiment of a FEXT canceller according to the invention.

FIG. 3 shows a first embodiment of the invention and more specifically a part of the receiver TX of a modem p on the LT side, receiving a FEXT corrupted signal. In this embodiment the blocks 38 and 39 represented with dotted lines do not exist.

Each modem i on the LT side is connected to a modem c(i) on the NT side through a transmission channel. The blocks 35, 36, 37 correspond to the blocks 15, 16, 17 of the receiver RX illustrated in FIG. 1.

This first embodiment aims at canceling the FEXT interference caused by the signals transmitted by n-1 modems c(i), i=1 to n, i≠p.

For clarity purpose, suppose first that a symbol carried by the subcarrier or tone fj is FEXT corrupted by symbols at the same frequency only. If, as illustrated on FIG. 2, $H(fj)=(H_{kl}(fj))$ the transfer matrix of the n transmission channels from the NT to the LT side, with k,l=1 ... n, fj being the frequency index with j=1 ... n, we can write in the frequency domain for the frequency fj:

$$R(fj)=H(fj)*S(fj),$$

where $R(fj)=Rk(fj)$, k=1 ... n, is the vector of the received frequency components and $S(fj)=Sk(fj)$, k=1 ... n, is the vector of the transmitted DMT symbols from the n modems, for the frequency fj.

The FEXT interference for a given frequency fj and for a modem p can therefore be written:

$$FEXT(fj) = \sum_{l=1}^{n} Hlp(fl)Sl(fj), 1 \neq p$$

According to the first embodiment of the invention, the complex values Sl(fj), l=1 ... n, l≠p are approximated by the symbols Ŝl(fj), i.e. by the symbols of the constellation coming the closest to the respective received frequency components Rl(fj), l=1 ... n, l≠p, respectively output by the demappers 37. This implies that the processing in the modem p is one-symbol delayed with respect to the other modems.

The complex symbols Ŝl(fj) from the other modems, l=1 ... n, l≠p, are then linearly combined in block 34 and subtracted by a subtractor 31 from the received frequency component Rp(fj) to produce a FEXT-removed complex value Tp(fj). The demapper 37 of modem p outputs a demapped word X̂p(fj) and the corresponding constellation point Ŝp(fj). The complex value Ŝp(fj) is subtracted from the complex value Tp(fj) to produce an error value. This error value is squared in a circuit 32 and processed in a block 33 to update the coefficients of the linear combination, for example according to the known steepest gradient algorithm. The updated values stored in block 33 will be used for FEXT canceling the next frequency component Rp(fj), i.e. the frequency component Rp(fj) of the next incoming block. After a few iterations, the linear combination coefficients converge towards the values Hlp(fj) of the transfer matrix.

We have considered above FEXT cancellation at a single tone fj. It is clear however that the processing should be repeated for all the tones j=1 to N, the frequency coefficients Rp(fj) being sequentially output by the parallel to serial converter 36. The linear combination coefficients for each frequency fj are stored in the memory of block 33. After a few iterations the memory contains the values Hlp(fj), l=1 ... n and l≠p, j=1 ... N.

We have assumed above that the FEXT at the different frequencies could be independently canceled. In a conventional DMT transmission system this can only be regarded as an approximation since the limited duration of the time domain blocks causes a spreading of the frequency components. Generally, the FEXT at a frequency fj depends also upon frequency components transmitted at neighboring frequencies. This problem can be tackled in two different ways.

Firstly, the crosstalk canceller of FIG. 1 can be adapted so as to take into account intra-frequency crosstalk coefficients Hlp(fi,fj), the modification being straightforward: the linear combination coefficients are now function of a couple of frequencies fi, fj. The processing in modem p has also to be delayed for a full time block since the knowledge of the $\hat{S}l(fj)$ at all the frequencies is necessary before starting the FEXT cancellation.

Secondly, if the modems are synchronous Zipper modems as described in the international application WO97/06619, which is incorporated herein by reference, the assumption made above is fully valid, i.e. the FEXT at a frequency fj is independent from the frequency components transmitted at the frequencies fi, i≠j. Indeed, in such modems, the cyclic extension added to each time domain block before transmission eliminates any inter-frequency crosstalk.

Figure 4:
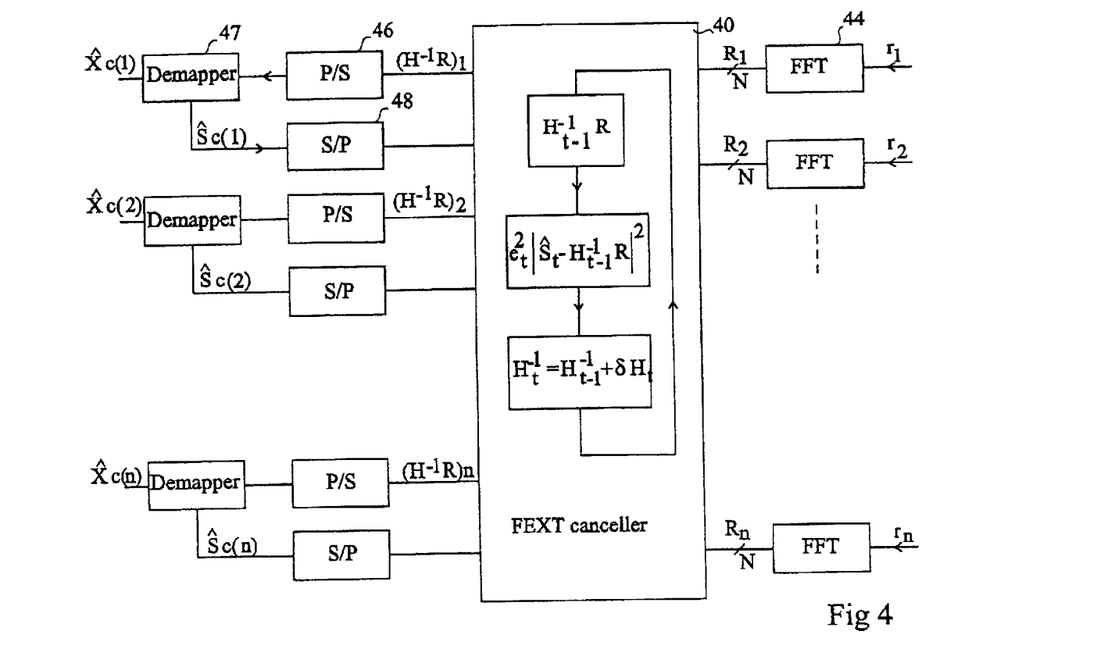
FIG. 4 shows a third embodiment of a FEXT canceller according to the invention.

FIG. 4 shows a second embodiment of the invention. In this embodiment, the FEXT second interference is canceled in a centralized manner by a crosstalk canceller 40 operating now for all the LT modems or at least for all the LT modems cross-linked by the same FEXT. The crosstalk canceller 40 receives the sets of frequency components Ri, i=1 to n (Ri=Ri(fj), j=1 to N) from FFT circuits 44 and uses Ri to approximate Si(fj). At time t, the vector R constituted by the Ri's is multiplied by the matrix $H^{-1}_{t-1}$ which is an estimate of the inverse of the transfer matrix at time t−1. The resulting vector is split up in n sets $(H^{-1}_{t-1}*R)_i$, each having N frequency components. Each set is parallel to serial converted by converters 46 and the frequency components $(H^{-1}_{t-1}*R)_i$ (fj) are then demapped by demappers 47. The demappers 47 output the nearest constellation symbols $\hat{S}i(fj)$ and the digital words $\hat{X}i(fj)$ associated therewith. For each line i, the N consecutive symbols $\hat{S}i(fj)$ belonging to the same time domain symbol are converted back by serial to parallel converters 48 and fed back to the crosstalk canceller circuit 40. The resulting vector $\hat{S}_t$ of N*n components is built and the vector $H^{-1}_{t-1}*R$ is subtracted therefrom, giving an error vector of norm $e_t$. The coefficients of the matrix $H^{-1}_{t-1}$ are then updated, for example according to the steepest gradient algorithm, to produce at time t+1 an updated matrix $H^{-1}_t$. The previous processing steps are iterated.

In contrast with the first and second embodiments, it should be emphasized that equalization is directly provided by the crosstalk canceller itself since it is taken into account by the diagonal coefficients of the matrix $H^{-1}_t$. In this embodiment the equalization coefficients and the crosstalk coefficients are co-estimated instead of being sequentially estimated. This leads to a more accurate evaluation of both groups of coefficients.

Figure 5:
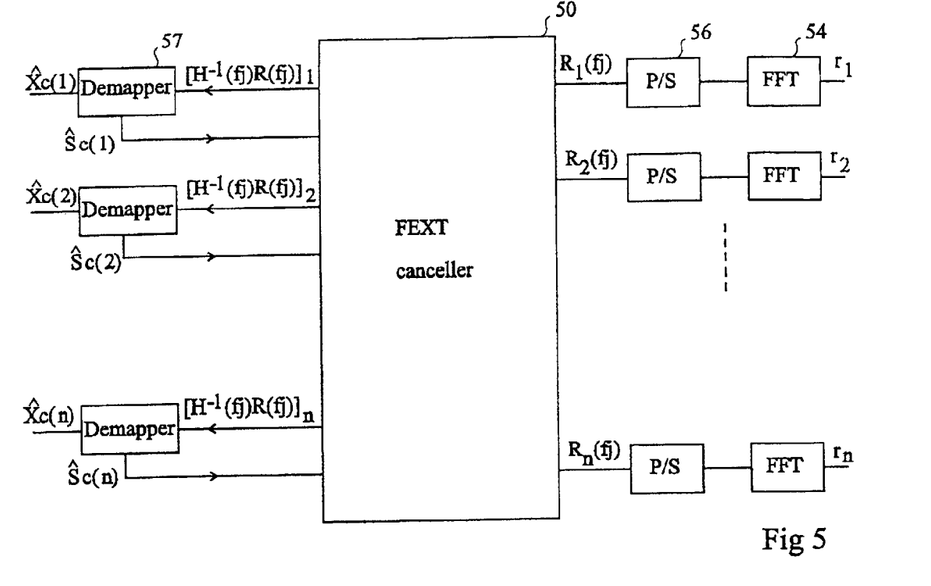
FIG. 5 shows a fourth embodiment of a FEXT canceller according to the invention.

FIG. 5 shows a fourth embodiment of the invention.

No assumption as to inter-frequency FEXT has been made with respect to the third embodiment. However, as discussed above, if the modems are of the synchronous Zipper type, the inter-frequency FEXT is negligible and the matrix $H^{-1}_t$ has the simple form of a block matrix exhibiting blocks $H^{-1}_t(fj)$, j=1 to N along its diagonal. In such an instance, FEXT cancellation can be performed sequentially for each frequency in a more simple way, as illustrated by FIG. 5. In contrast with FIG. 4, parallel to serial converters 56 sequentially provide the frequency components Ri(fj) to the crosstalk canceller 50. The product of the vector R(fj) constituted by the Ri(fj)'s is multiplied by the matrix $H^{-1}_{t-1}$(fj) which is an estimate of the inverse of the transfer matrix at time t−1 and frequency fj. The N components (complex scalar values) of the resulting vector are demapped by demappers 57 and the respective closest constellation symbols $\hat{S}i(fj)$, i=1 to N are fed back to the FEXT canceller. The error calculation and the updating of the coefficients are a simple transposition of those set out in the description of the third embodiment.

Figure 6:
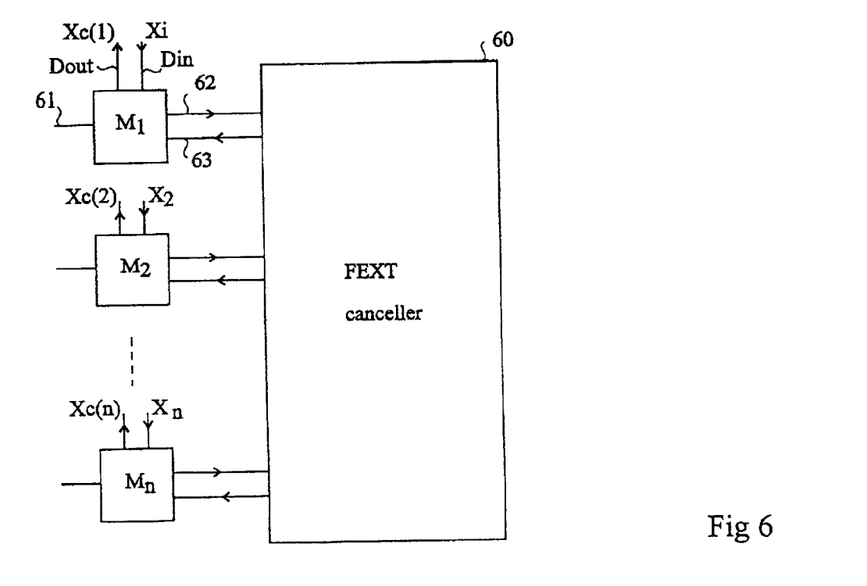
FIG. 6 schematically shows the overall structure of a DSL transmission system comprising a FEXT canceller according to the third or the fourth embodiment of the invention.

FIG. 6 shows the overall structure of a DSL transmission system with a FEXT canceller 60 according to the third or the fourth embodiment connected to n LT modems M1 ... Mn. Each modem is connected to a bi-directional transmission line 61, an input Din and an output Dout for inputting the digital words X(i) to be transmitted and outputting the received words $\hat{X}i(fj)$. In addition, each modem has an input 63 for inputting the values $(H^{-1}*R)_i$ and an output 62 for outputting the nearest constellation symbols $\hat{S}i(fj)$.

Although the embodiments have been described with an adaptation of the linear combination coefficients/matrix coefficients for each time domain block received, it should be understood that this adaptation can be made at a much lower rate, depending upon the characteristics of the transmission channels.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A far-end crosstalk canceling circuit for a digital subscriber line transmission system, said transmission system comprising a plurality of line termination modems adapted to receive discrete multitone signals from corresponding network termination modems over a plurality of transmission channels, each of the plurality of line termination modems comprising time/frequency transforming means for transforming said discrete multitone signals into a discrete multitone symbol of frequency components and demapping means for outputting for each frequency component a symbol of a constellation nearest to each frequency component and corresponding demodulated data, the far-end crosstalk canceling circuit comprising:

estimation means, in at least one line termination modem, for estimating constellation symbols actually sent by the network termination modems from the frequency components of the discrete multitone symbols generated by the plurality of line termination modems;

calculation means for calculating a linear combination of said estimated constellation symbols, subtracting said linear combination from the frequency components generated by said at least one line termination modem, and applying a resulting difference to the demapping means of the at least one line termination modem;

error calculation means for calculating an error distance between the symbol of the constellation output from the at least one line termination modem and said resulting difference; and updating means for updating coefficients of said linear combination as a function of said error distance.

2. The far-end crosstalk canceling circuit of claim 1, wherein the estimation means further comprises means for providing the symbols of the constellations respectively output by the demapping means of the plurality of line termination modems as estimates of modulated data sent by the corresponding network termination modems.

3. The far-end crosstalk canceling circuit of claim 1, wherein the estimation means further comprises switching means for outputting the frequency components in a first step, and the estimated constellation symbols obtained therefrom in a second step.

4. The far-end crosstalk canceling circuit of claim 1, wherein:
the estimation means is common to all of the plurality of line termination modems and simultaneously provides the discrete multitone symbols as estimates for consecutive constellation symbols;
the calculating means is common to all of the plurality of line termination modems and comprises matrix calculation means calculating at time t a product $H^{-1}_{t-1}*R$ of a matrix $H^{-1}_{t-1}$ with a vector R, R being constituted by all sets of frequency components Ri, the matrix $H^{-1}_{t-1}$ being an estimate at time t−1 of an inverse of a transfer matrix of the plurality of transmission channels;
the error calculating means is common to all of the plurality of line termination modems and calculates the error distance as between each of n components of the product $H^{-1}_t*R$ and the symbols of the constellations output by the respective demapping means of the plurality of line termination modems; and
the updating means is common to all of the plurality of line termination modems and updates coefficients of the matrix $H^{-1}_{t-1}$ as a function of said error distance.

5. The far-end crosstalk canceling circuit of claim 1, further comprising parallel to serial converters for transforming the sets of frequency components Ri into respective serial streams of frequency components, wherein:
the estimation means is common to all of the plurality of line termination modems and simultaneously provides the frequency components as estimates for the constellation symbols;
the calculating means is common to all of the plurality of line termination modems and comprises matrix calculation means sequentially calculating at time t, for each tone j a product $H^{-1}_{t-1}(fj)*R(fj)$ of a matrix $H^{-1}_{t-1}(fj)$ with a vector R(fj) constituted by all the frequency components Ri(fj) at a frequency fj, $H^{-1}_{t-1}(fj)$ being an estimate at time t−1 of an inverse of a transfer matrix at the frequency fj of the plurality of transmission channels;
the error calculating means is common to all of the plurality of line termination modems and sequentially calculates for each tone j the error distance as between each of the n components of the product $H^{-1}_t(fj)*R(fj)$ and constellation points i(fj) output by the respective demapping means of the plurality of line termination modems;
the updating means is common to all of the plurality of line termination modems and sequentially updates for each tone j coefficients of the matrix $H^{-1}_{t-1}(fj)$ as a function of said error distance.

6. A digital subscriber line transmission system comprising a far-end crosstalk canceling circuit according to claim 4, in which the plurality of line termination modems and corresponding network termination modems are of a synchronous Zipper type.

7. A far-end crosstalk canceling method for a digital subscriber line transmission system, said transmission system comprising a plurality of line termination modems adapted to receive discrete multitone signals from corresponding network termination modems over a plurality of transmission channels, each of the plurality of line termination modems comprising frequency transforming means for transforming said discrete multitone signals into a discrete multitone symbol of frequency components, and demapping means for outputting for each frequency component a symbol of the constellation nearest to each frequency component and corresponding demodulated data, the method comprising the steps of:
estimating, for at least one line termination modem, constellation symbols actually sent by the network termination modems, from the frequency components of the discrete multitone symbols generated by the plurality of line termination modems;
calculating a linear combination of said estimated constellation symbols, subtracting said linear combination from the frequency components generated by the at least one line termination modem, and applying a resulting difference to the demapping means of the at least one line termination modem, to obtain the symbol of the constellation;
calculating the error distance between the symbol of the constellation and said resulting difference; and
updating coefficients of said linear combination as a function of said error distance.

8. The far-end crosstalk canceling method of claim 7, wherein the step of estimating further comprises providing the symbols of the constellations respectively output by the demapping means of the plurality of line termination modems as estimates of modulated data sent by the corresponding network modems.

9. The far-end crosstalk canceling method of claim 7, wherein the step of estimating further comprises providing the frequency components in a first step and the estimated constellation symbols obtained therefrom in a second step.

10. The far-end crosstalk canceling method of claim 7, wherein:
the step of estimating is carried out for all of the plurality of line termination modems and simultaneously provides the frequency components as estimates for consecutive constellation symbols;
the step of calculating is carried out for all of the plurality of line termination modems and comprises calculating at step t a product $H^{-1}_{t-1}*R$ of a matrix $H^{-1}_{t-1}$ with a vector R, R being constituted by n discrete multitone symbols Ri, the matrix $H^{-1}_{t-1}$ being an estimate at step t−1 of an inverse of a transfer matrix of the plurality of transmission channels;
the step of calculating the error distance is carried out for all of the plurality of line termination modems and calculates the error distance as between each of n components of the product $H^{-1}_{t-1}*R$ and the symbols of the constellation output by the respective demapping means of the plurality of line termination modems; and
the act of updating is carried out for all of the plurality of line termination modems and updates coefficients of the matrix $H^{-1}_{t-1}$ as a function of said error distance.

11. The far-end crosstalk canceling method of claim 7, further comprising a step of:
parallel to serial converting the discrete multitone symbols into respective serial streams of frequency components;

wherein:

the step of estimating is carried out for all of the plurality of line termination modems and simultaneously provides the frequency components as estimates for the constellation symbols;

the step of calculating is carried out for all of the plurality of line termination modems and sequentially calculates at step t, for each tone j, a product $H^{-1}_{t-1}(fj)*R(fj)$ of a matrix $H^{-1}_{t-1}(fj)$ with a vector R(fj) constituted by all the frequency components Ri(fj) at a frequency fj, $H^{-1}_{t-1}(fj)$ being an estimate at time t−1 of an inverse of a transfer matrix at the frequency fj of the plurality of transmission channels;

the step of calculating an error distance is carried out for all of the plurality of line termination modems and sequentially calculates, for each tone j, a sum of the error distance as between each of n components of the product $H^{-1}_t(fj)*R(fj)$ and constellation symbols i(fj) output by the respective demapping means of the plurality of line termination modems;

the step of updating is carried out for all of the plurality of line termination modems and sequentially updates for each tone j coefficients of the matrix $H^{-1}_{t-1}(fj)$ as a function of said error distance.

12. In a communication system including a first phase modulated carrier signal and a plurality of second phase modulated carrier signals, the first phase modulated carrier signal and the plurality of second phase modulated carrier signals having a same carrier frequency, a method comprising an act of:

a) applying a linear combination of estimated complex symbols derived from the plurality of second phase modulated carrier signals to a first complex symbol derived from the first phase modulated carrier signal, wherein the act a) further comprises an act of:

subtracting the linear combination of estimated complex symbols from the first complex symbol to generate a third complex value;

further comprising acts of:

demapping the third complex value to a phase modulation constellation point;

making a comparison of the phase modulation constellation point and the third complex value; and generating an error value based on the comparison.

13. The method of claim 12, wherein the act a) further comprises an act of reducing far-end crosstalk in the first phase modulated carrier signal.

14. The method of claim 12, wherein the first phase modulated carrier signal includes a first quadrature amplitude modulated carrier signal, wherein the plurality of second phase modulated carrier signals includes a plurality of second quadrature amplitude modulated carrier signals, and wherein the act a) comprises an act of:

applying the linear combination of the estimated complex symbols derived from the plurality of second quadrature amplitude modulated carrier signals to the first complex symbol derived from the first quadrature amplitude modulated carrier signal.

15. The method of claim 12, wherein the act a) further comprises an act of:

b) calculating the linear combination of estimated complex symbols based on a plurality of weighting values associated with the plurality of second phase modulated carrier signals.

16. The method of claim 15, wherein the act b) further comprises acts of:

multiplying each estimated complex symbol of the estimated complex symbols by a corresponding one of the plurality of weighting values to generate a plurality of weighted estimated complex symbols; and calculating a sum of the plurality of weighted estimated complex symbols to generate the linear combination.

17. The method of claim 12, further comprising an act of:

updating, based on the error value, at least one of a plurality of weighting values associated with the plurality of second phase modulated carrier signals.

18. The method of claim 17, further comprising acts of:

multiplying, after the act of updating, each estimated complex symbol of the estimated complex symbols by a corresp onding one of the plurality of weighting values, to generate a plurality of weighted estimated complex symbols; and calculating a sum of the plurality of weighted estimated complex symbols to generate the linear combination.

19. The method of claim 12, wherein the act of making a comparison of the phase modulation constellation point and the third complex value comprises subtracting the phase modulation constellation point from the third complex value.

20. The method of claim 12, wherein the act of demapping the third complex value further comprises generating a digital word corresponding to the third complex value.

21. In a communication system including a first phase modulated carrier signal and a plurality of second phase modulated carrier signals, the first phase modulated carrier signal and the plurality of second phase modulated carrier signals having a same carrier frequency, an apparatus comprising:

a controller to apply a linear combination of estimated complex symbols derived from the plurality of second phase modulated carrier signals to a first complex symbol derived from the first phase modulated carrier signal, wherein the controller further comprises a first subtractor to subtract the linear combination of estimated complex symbols from the first complex symbol to generate a third complex value;

wherein the controller further comprises:

a demapper to demap the third complex value to a phase modulation constellation point; and a comparator to make a comparison of the phase modulation constellation point and the third complex value to generate an error value.

22. The apparatus of claim 21, wherein the controller is adapted to reduce far-end crosstalk in the first phase modulated carrier signal.

23. The apparatus of claim 21, wherein the first phase modulated carrier signal includes a first quadrature amplitude modulated carrier signal, wherein the plurality of second phase modulated carrier signals includes a plurality of second quadrature amplitude modulated carrier signals, and wherein the controller applies the linear combination of the estimated complex symbols derived from the plurality of second quadrature amplitude modulated carrier signals to the first complex symbol derived from the first quadrature amplitude modulated carrier signal.

24. The apparatus of claim 21, wherein the controller comprises a calculator to calculate the linear combination of symbols based on a plurality of weighting values associated with the plurality of second phase modulated carrier signals.

25. The apparatus of claim 24, wherein the calculator comprises:
a multiplier to multiply each estimated complex symbol of the estimated complex symbols by a corresponding one of the plurality of weighting values to generate a plurality of weighted estimated complex symbols; and
an adder to calculate a sum of the plurality of weighted estimated complex symbols to generate the linear combination.

26. The apparatus of claim 21, wherein the controller further comprises:
a processor to update, based on the error value, at least one of a plurality of weighting values associated with the second phase modulated carrier signals.

27. The apparatus of claim 26, wherein the controller further comprises:
a multiplier to multiply each complex symbol of the estimated complex symbols by a corresponding one of the plurality of weighting values to generate a plurality of weighted estimated complex symbols; and
an adder to calculate a sum of the plurality of weighted estimated complex symbols to generate the linear combination.

28. The apparatus of claim 21, wherein the comparator further comprises a second subtractor to subtract the phase modulation constellation point from the third complex value.

29. The apparatus of claim 21, wherein the demapper generates a digital word corresponding to the third complex value.

30. The apparatus of claim 21, wherein the communication system includes at least one modem coupled to the controller, and wherein the apparatus includes the controller in combination with the at least one modem.

31. The combination of claim 30, wherein the at least one modem includes the controller.

32. A method for reducing far-end crosstalk in a communication system including at least a first phase modulated carrier signal and a second phase modulated carrier signal, the first and second phase modulated carrier signals having a same carrier frequency, the method comprising acts of:
a) making a first estimation of a first complex symbol derived from at least the second phase modulated carrier signal;
b) making a first comparison of the first estimation of the first complex symbol and a second complex symbol derived from the first phase modulated carrier signal;
c) generating a third complex value based on the first comparison;
d) demapping the third complex value to a phase modulation constellation point and a corresponding digital output;
e) making a second comparison of the phase modulation constellation point and the third complex value;
f) generating an error value based on the second comparison; and
g) making a second estimation of the first complex symbol based on the error value.

33. The method of claim 32, further comprising acts of:
h) repeating the acts b) through f), substituting the second estimation of the first complex symbol for the first estimation of the first complex symbol; and
i) making a third estimation of the first complex symbol based on the error value.

34. The method of claim 32, wherein the second phase modulated carrier signal includes a plurality of second phase modulated carrier signals, and wherein the act a) further comprises acts of:
a1) estimating a plurality of complex symbols derived from the plurality of second phase modulated carrier signals; and
a2) calculating a linear combination of the plurality of estimated complex signals to generate the first complex symbol.

35. An apparatus for reducing far-end crosstalk in a communication system including at least a first phase modulated carrier signal and a second phase modulated carrier signal, the first and second phase modulated carrier signals having a same carrier frequency, the apparatus comprising:
a) means for making a first estimation of a first complex symbol derived from at least the second phase modulated carrier signal;
b) means for making a first comparison of the first estimation of the first complex symbol and a second complex symbol derived from the first phase modulated carrier signal;
c) means for generating a third complex value based on the first comparison;
d) means for demapping the third complex value to a phase modulation constellation point and a corresponding digital output;
e) means for making a second comparison of the phase modulation constellation point and the third complex value;
f) means for generating an error value based on the second comparison; and
g) means for making a second estimation of the first complex symbol based on the error value.

* * * * *

UNITED STATES PATENT AND TRADEMARK OFFICE
CERTIFICATE OF CORRECTION

PATENT NO. : 6,987,800 B2
DATED : January 17, 2006
INVENTOR(S) : Thomas Nordström, Daniel Bengtsson and Olivier Isson It is certified that error appears in the above-identified patent and that said Letters Patent is hereby corrected as shown below:

Column 4,
Line 35, should read $$FEXT(fj) = \sum_{l=1}^{n} Hlp(fj)Sl(fj), l \neq p$$

Signed and Sealed this

Twenty-eighth Day of March, 2006

JON W. DUDAS
*Director of the United States Patent and Trademark Office*